US006874445B2

(12) United States Patent
Polimeni, Jr.

(10) Patent No.: US 6,874,445 B2
(45) Date of Patent: Apr. 5, 2005

(54) PET FEEDER

(76) Inventor: Ralph F. Polimeni, Jr., 15205 Bailey Canyon Ct., Reno, NV (US) 89511

( * ) Notice: Subject to any disclaimer, the term of this patent is extended or adjusted under 35 U.S.C. 154(b) by 0 days.

(21) Appl. No.: 10/390,316

(22) Filed: Mar. 17, 2003

(65) Prior Publication Data
US 2004/0182326 A1 Sep. 23, 2004

(51) Int. Cl.⁷ ............................ A01K 39/02; A01K 7/00
(52) U.S. Cl. .......................................... 119/74; 119/51.5
(58) Field of Search ............................ 119/74, 72, 51.5, 119/61, 52.1, 57.1

(56) References Cited

U.S. PATENT DOCUMENTS

| 3,730,141 | A | * | 5/1973 | Manning et al. ............ 119/51.5 |
| 4,192,256 | A | | 3/1980 | Clugston |
| 4,276,299 | A | * | 6/1981 | Della Bella et al. ......... 514/378 |
| 4,426,956 | A | | 1/1984 | McKinstry |
| 4,450,790 | A | | 5/1984 | Stansbury, Jr. |
| 4,573,434 | A | | 3/1986 | Gardner |
| 4,976,220 | A | * | 12/1990 | Gershman ..................... 119/475 |
| 5,105,768 | A | | 4/1992 | Johnson |
| 5,636,592 | A | * | 6/1997 | Wechsler .................... 119/52.1 |
| 5,738,039 | A | | 4/1998 | Berman et al. |
| 5,809,934 | A | * | 9/1998 | Gavet ......................... 119/52.1 |
| 6,055,932 | A | * | 5/2000 | Weber ......................... 119/52.1 |
| 6,101,974 | A | * | 8/2000 | Frohlich ...................... 119/51.5 |
| 6,467,428 | B1 | * | 10/2002 | Andrisin et al. ............ 119/51.5 |

* cited by examiner

Primary Examiner—Son T. Nguyen
(74) Attorney, Agent, or Firm—William H. Eilberg

(57) ABSTRACT

A pet feeder includes a base and a lid, the base defining a bowl and the lid defining a reservoir. The base and lid are connected by a hinge, such that the lid can be retained in an open position. Solid food or liquid flows from the reservoir, through a valve, into the bowl. In the case of liquid, the supply of liquid in the bowl is continuously replenished due to the flow of liquid, by gravity, into the bowl. In another embodiment, the feeder may include a single base and separate bowls and separate lids, so that the feeder may provide both solid food and liquid simultaneously. When the lid is closed, the pet feeder becomes a compact structure that can be easily stored and transported.

6 Claims, 10 Drawing Sheets

PET FEEDER

BACKGROUND OF THE INVENTION

The present invention relates to the field of caring for pets, and provides an apparatus for automatically supplying liquids or solid food to a pet.

Pet owners continually face the problem of how to care for their pets on automobile trips or vacations. The members of a family may wish to bring their pets with them on an automobile trip, or on an all-day outing. Upon reaching their destination, the family members may want to pursue various recreational activities, leaving the pet to play by itself, and may not want to worry about feeding the pet.

Also, the requirement of caring for a pet increases the number of items that must be remembered and packed before the trip. The pet owners must pack not only a supply of food and water, but also at least two bowls from which the pet can eat and drink. When on a trip or vacation, there may be many items to bring, and the above-described pet feeding items may add to an already long list. Moreover, the equipment needed for caring for the pet may take up scarce space in a vehicle.

The present invention makes it easier to travel or vacation with a pet, by providing a simple, compact, and convenient device that not only stores solid food and/or water, but which also automatically supplies a pet with liquids, solid food, or both, at the destination. The feeder of the present invention can be easily stored and transported in a closed condition, yet quickly opened when needed for dispensing food or water.

SUMMARY OF THE INVENTION

The present invention comprises a pet feeder which dispenses solid food or liquid, or both, to a pet, especially in the absence of the pet owner. In one preferred embodiment, the feeder includes a base portion which has a bowl, and a lid portion defining a reservoir, the base portion and the lid portion being connected by a hinge. A passageway or conduit connects the reservoir to the bowl. The hinge preferably includes a detent arrangement which holds the lid portion firmly in either an opened or a closed position.

The pet feeder preferably includes a valve which controls the flow of solid food or liquid out of the reservoir. For the embodiment intended to dispense liquid, the passageway includes a tube which conducts liquid from the reservoir and through the valve, and into an outlet pipe disposed within the bowl. The end of the outlet pipe is spaced apart from the bottom of the bowl, and this spacing determines the depth of liquid in the bowl. As long as the valve is open, and as long as there is liquid in the reservoir, the pet feeder will, due to gravity, maintain a predetermined supply of liquid at the bottom of the bowl.

For the embodiment intended to dispense solid food, the base portion is preferably constructed with a chute that channels the food exiting the reservoir into the bowl.

The pet feeder can also be constructed so that it dispenses either or both of solid food and liquid. In this embodiment, the base portion includes separate bowls for solid food and liquid, and there are two individually operable lids, with separate reservoirs for holding solid food and liquid. Both sections of the pet feeder in this embodiment function in a manner similar to corresponding components of the previous embodiments.

The pet feeder preferably includes a cut-out in the lid portion, the cut-out serving as a handle when the lid is closed. The pet feeder can therefore be conveniently transported by holding it by the handle. Also, the lid may include a recess that facilitates manual gripping of the lid when it is desired to open the feeder.

The present invention therefore has the primary object of providing a pet feeder.

The invention has the further object of providing apparatus which automatically dispenses liquids, such as water, to a pet, in the absence of the pet owner.

The invention has the further object of providing a convenient pet feeder which stores solid food, and which also provides a bowl from which a pet may eat.

The invention has the further object of providing a compact and portable pet feeder.

The invention has the further object of providing a pet feeder which integrates a solid food or liquid reservoir and a bowl, such that the food or water and the bowl need not be carried separately.

The invention has the further object of providing a pet feeder which provides convenient means for draining liquid from the bowl when the pet feeder is to be moved.

The invention has the further object of providing a pet feeder which dispenses either or both of solid food and liquid.

The invention has the further object of providing a method of dispensing solid food and/or liquid to a pet, especially in the absence of the pet owner.

The reader skilled in the art will recognize other objects and advantages of the invention, from a reading of the following brief description of the drawings, the detailed description of the invention, and the appended claims.

DETAILED DESCRIPTION OF THE INVENTION

Figure 1:
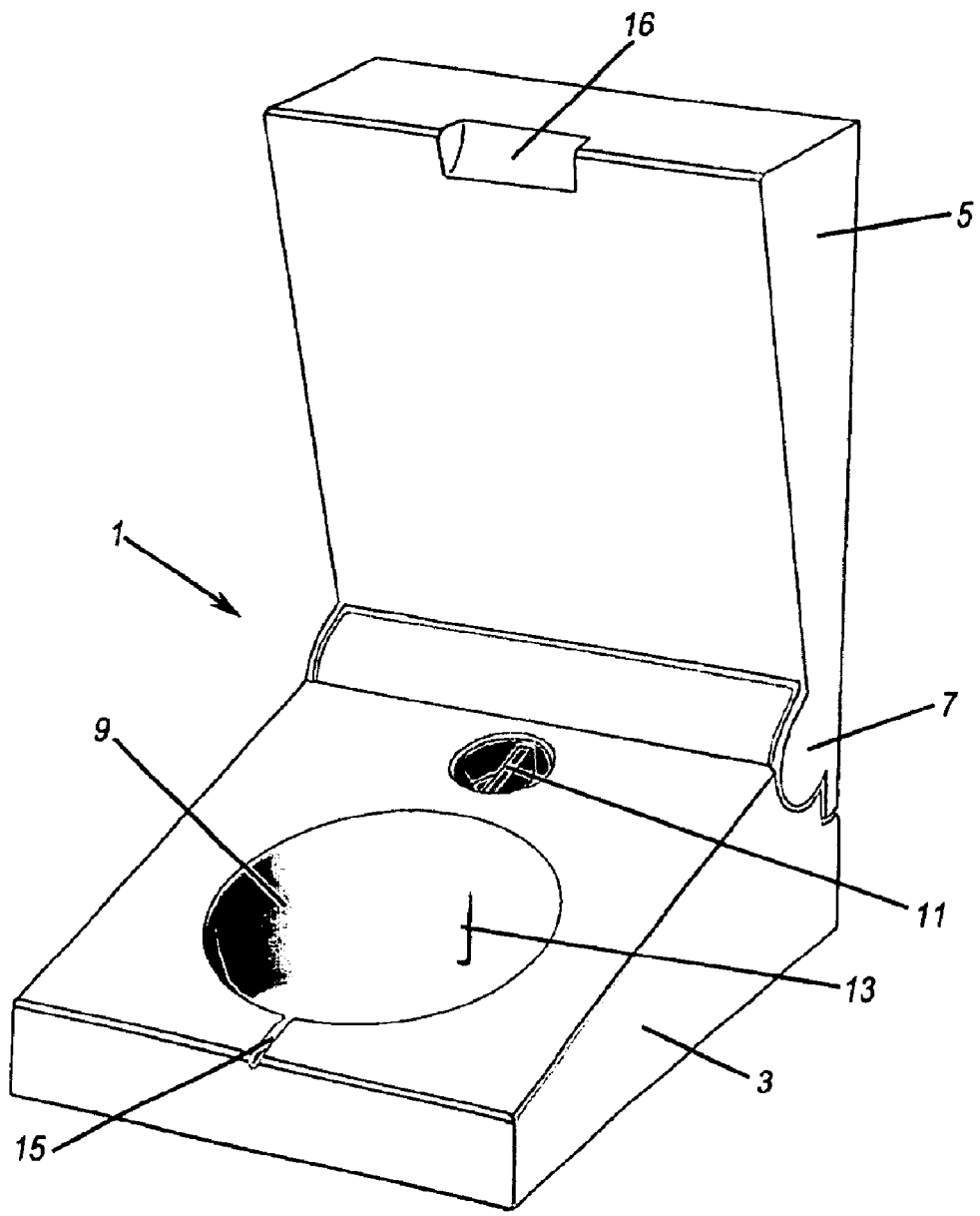
FIG. 1 provides a perspective view, taken from the front, of the pet feeder of the present invention, with the lid in the open position.

FIG. 1 provides a perspective view showing the pet feeder of the present invention, in its opened condition. The embodiment shown is intended for storing and dispensing liquid, such as water, to a pet.

Pet feeder 1 comprises a base 3 and a lid 5, the base and the lid being connected by hinge 7. A bowl 9 is preferably defined by the base. Also formed in the base is a valve 11 which can be manually turned on or off. The valve allows water, or other liquid, to flow from a reservoir formed in the lid, into the bowl, through outlet pipe 13. Groove 15, which is formed in the base and extends to the edge of the bowl, allows unused water to drain from the bowl when the lid is closed and the unit is about to be moved. Recess 16 comprises a cut-out at one end of the lid, and makes it easy to open the lid manually by grasping the end of the lid.

As shown in FIG. 1, the outlet pipe 13 terminates at a position that is spaced apart from the bottom of the bowl 9. The height of the end of the outlet pipe, relative to the bottom of the bowl, determines the level of liquid in the bowl. Once the liquid level reaches and covers the end of the pipe, there will exist a hydrostatic equilibrium, and no further liquid will flow into the bowl until enough liquid has been consumed or evaporated that the liquid level again falls below the end of the pipe. The length of the pipe can be selected so as to determine the equilibrium depth of the liquid in the bowl. It has been found that most animals do not care about the depth of the liquid, as long as there is enough liquid available for drinking. Thus, it is preferred to make the pipe sufficiently long that it extends almost to the bottom of the bowl, so as to minimize the amount of liquid that is in the bowl at any one time.

Figure 2:
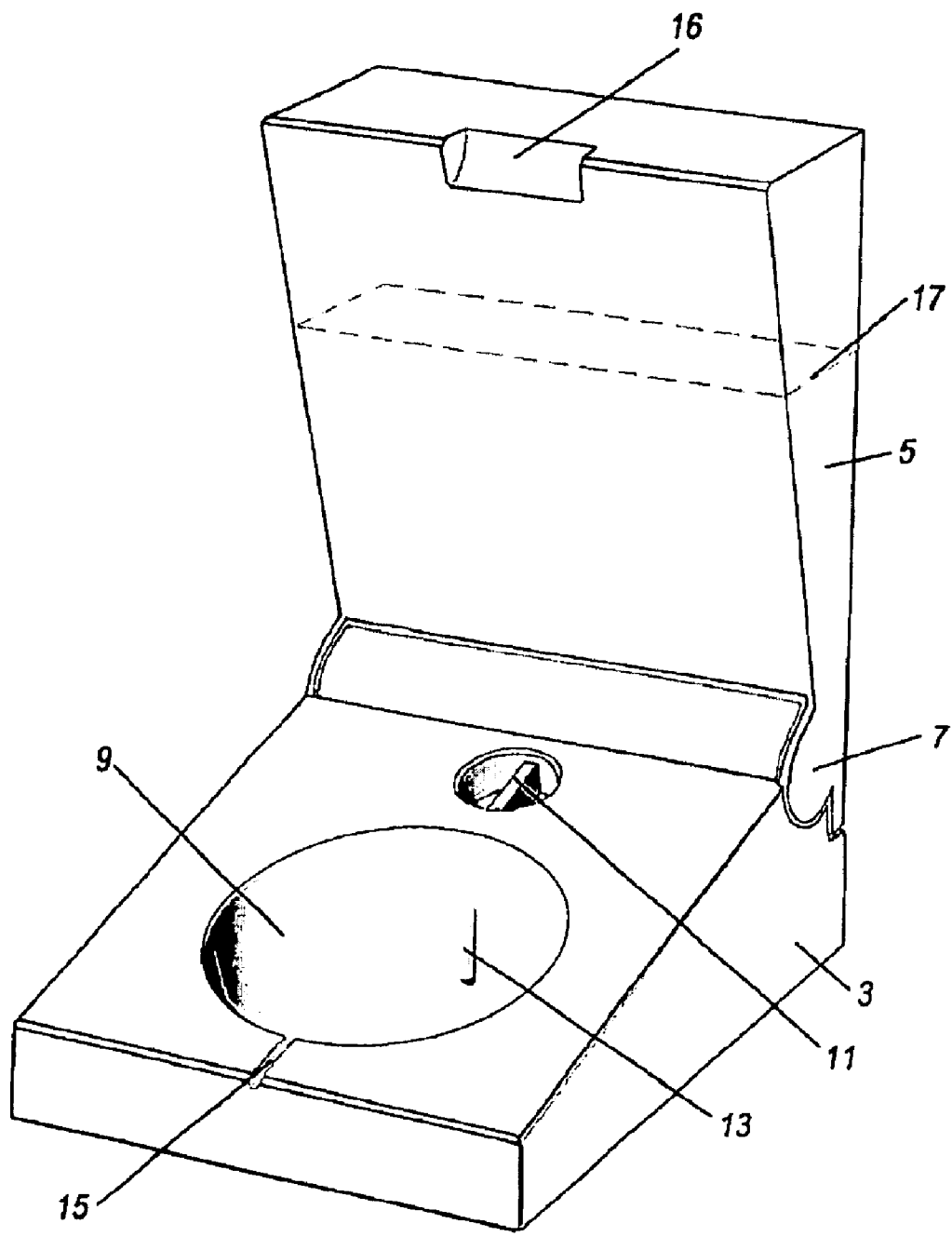
FIG. 2 provides a perspective view of the pet feeder of the present invention, using a dotted outline to indicate the water level in the reservoir located in the lid.

FIG. 2 shows another perspective view of the open pet feeder, the figure showing, in dotted outline, the liquid level 17 in the reservoir. The reservoir may occupy substantially all, or only a part of, the space within the lid. The greater the proportion of space occupied by the reservoir, the longer the pet feeder can continuously supply liquid to a pet.

Figure 3:
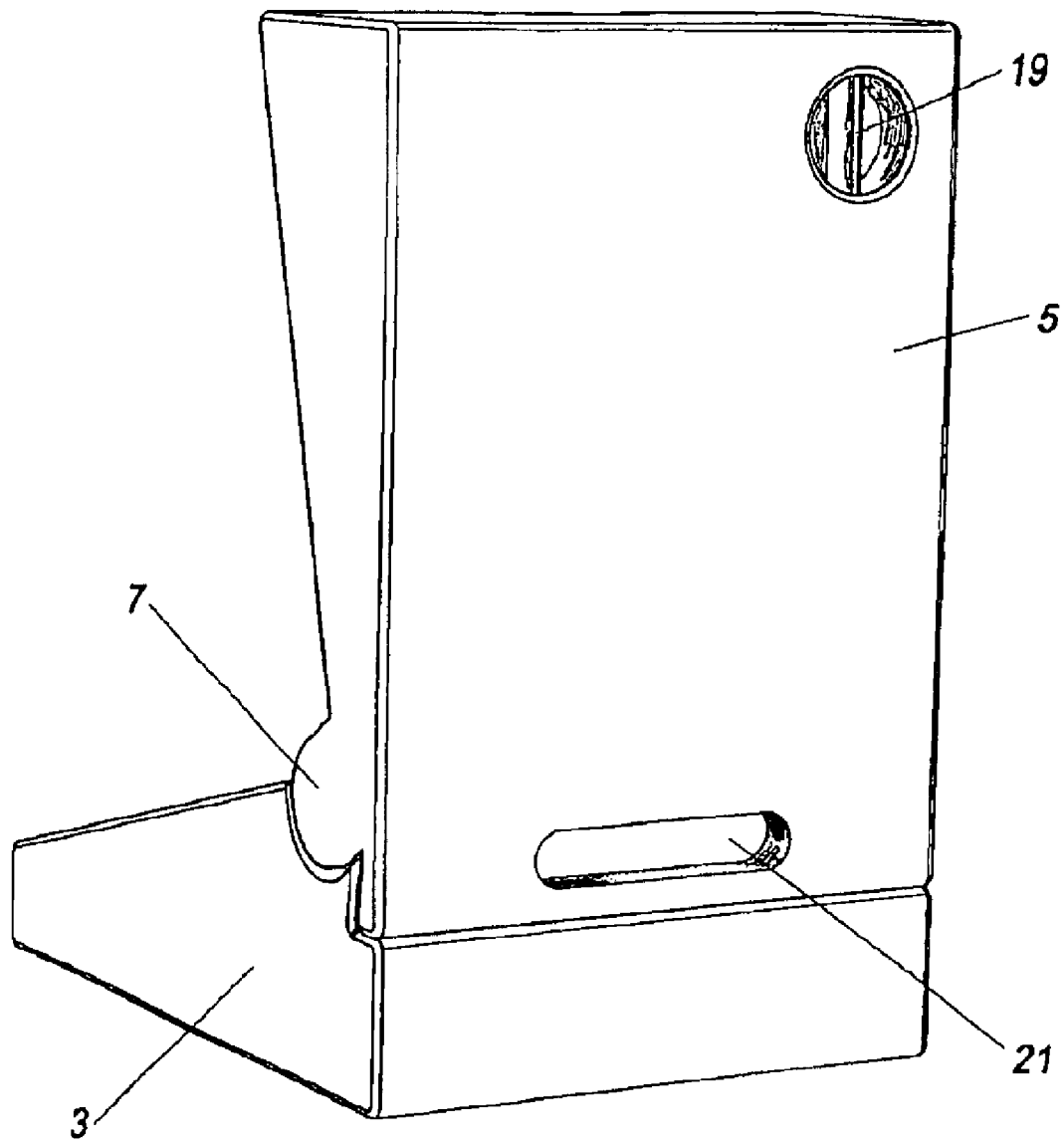
FIG. 3 provides a perspective view, taken from the rear, of the pet feeder of the present invention.

FIG. 3 provides a perspective view of the opened pet feeder, showing the back of the lid 5. This figure shows fill plug 19, which can be removed to provide access to the reservoir, allowing a user to pour liquid into the reservoir. A cut-out 21, formed in the lid, defines a handle which makes it easy to carry the feeder, in the closed position.

Figure 4:
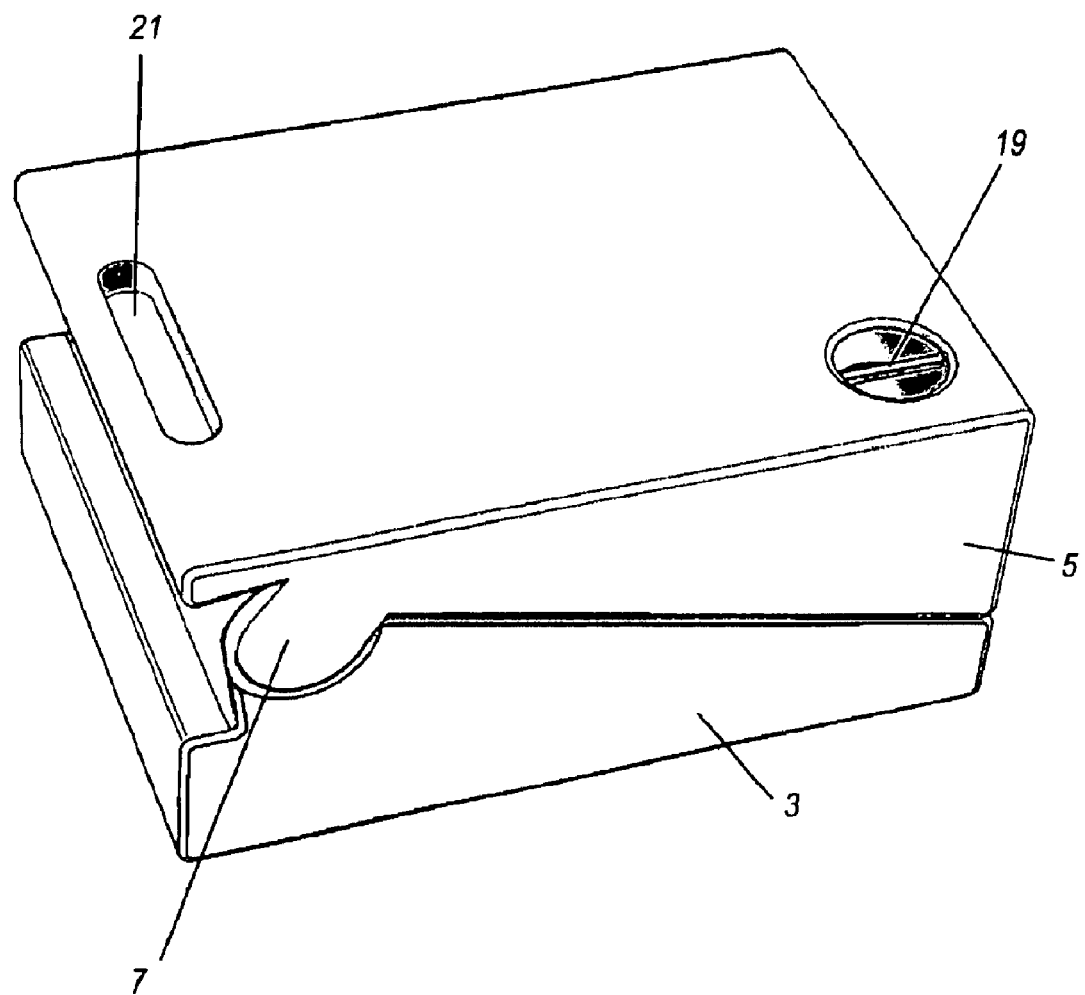
FIG. 4 provides a perspective view, showing the side and rear of the pet feeder of the present invention, the feeder being in the closed position.
Figure 5:
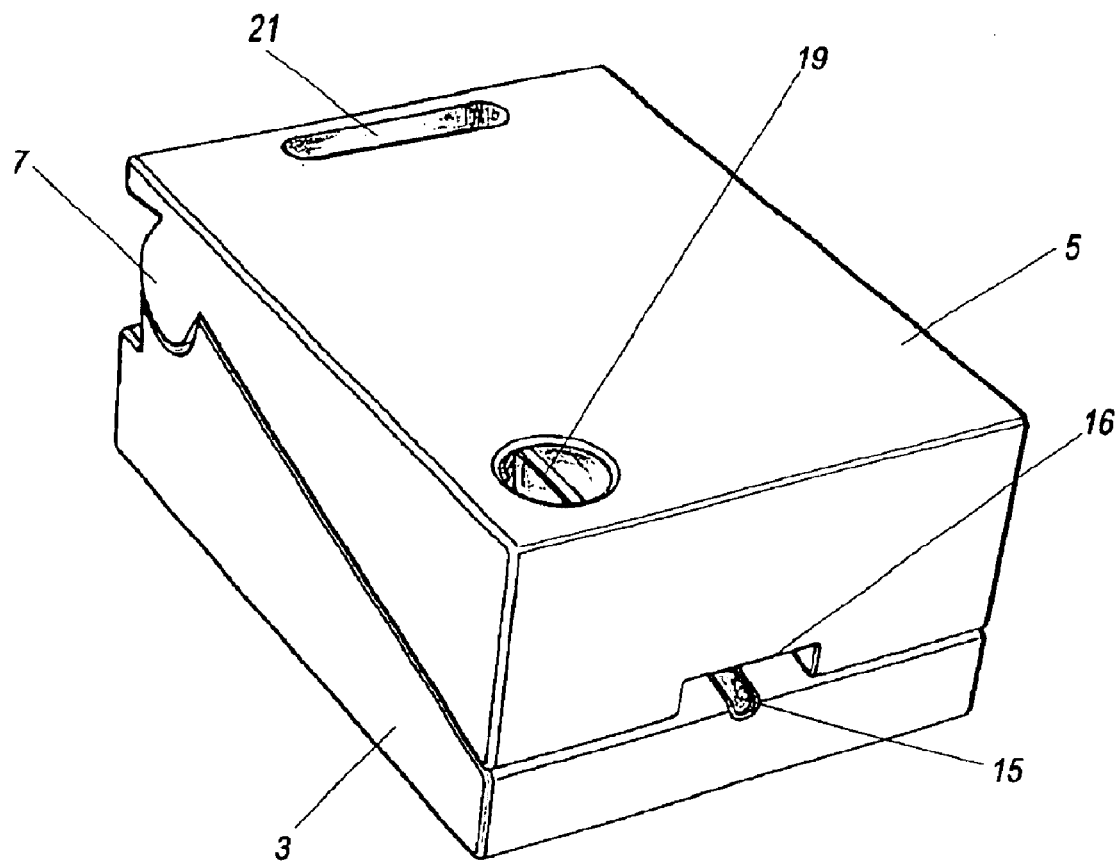
FIG. 5 provides a perspective view showing the side and front of the pet feeder of the present invention, the feeder being in the closed position.

FIG. 4 shows the pet feeder in the closed position, and more clearly illustrates how the cut-out 21 can function as a handle. FIG. 5 also shows the pet feeder in the closed position, but from a different viewpoint. FIG. 5 clearly shows the groove 15, which, when the lid is closed, becomes disposed within recess 16. FIG. 5 makes it clear that when the feeder is lifted by the handle defined by cut-out 21, the groove will point generally downward, and will drain water from the bowl. FIG. 5 also illustrates the fact that the lid may be opened by grasping the lid, at the location of recess 16, and lifting the lid. The recess therefore defines a convenient handgrip for opening the lid.

Figure 6:
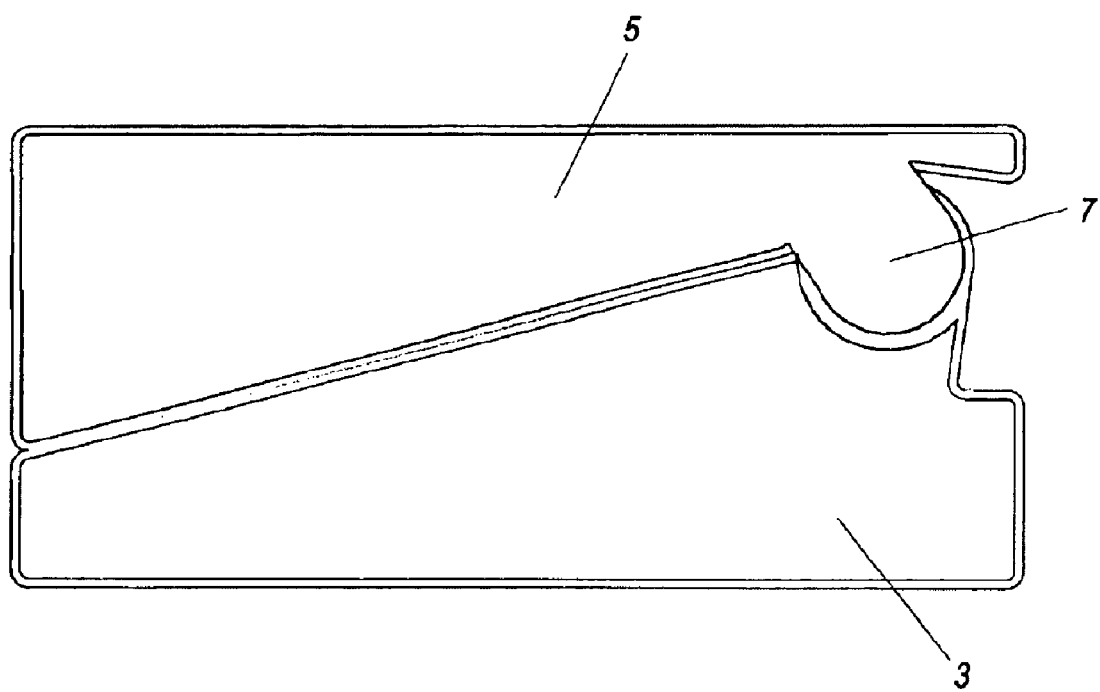
FIG. 6 provides a side elevational view of the pet feeder of the present invention, the feeder being in the closed position.

FIG. 6 provides a side elevational view of the pet feeder in the closed position. This figure shows that, in the preferred embodiment, the feeder defines a structure of generally rectangular cross-section when in the closed position. Thus, the pet feeder of the present invention provides a compact structure that is easy to store and transport.

Figure 7:
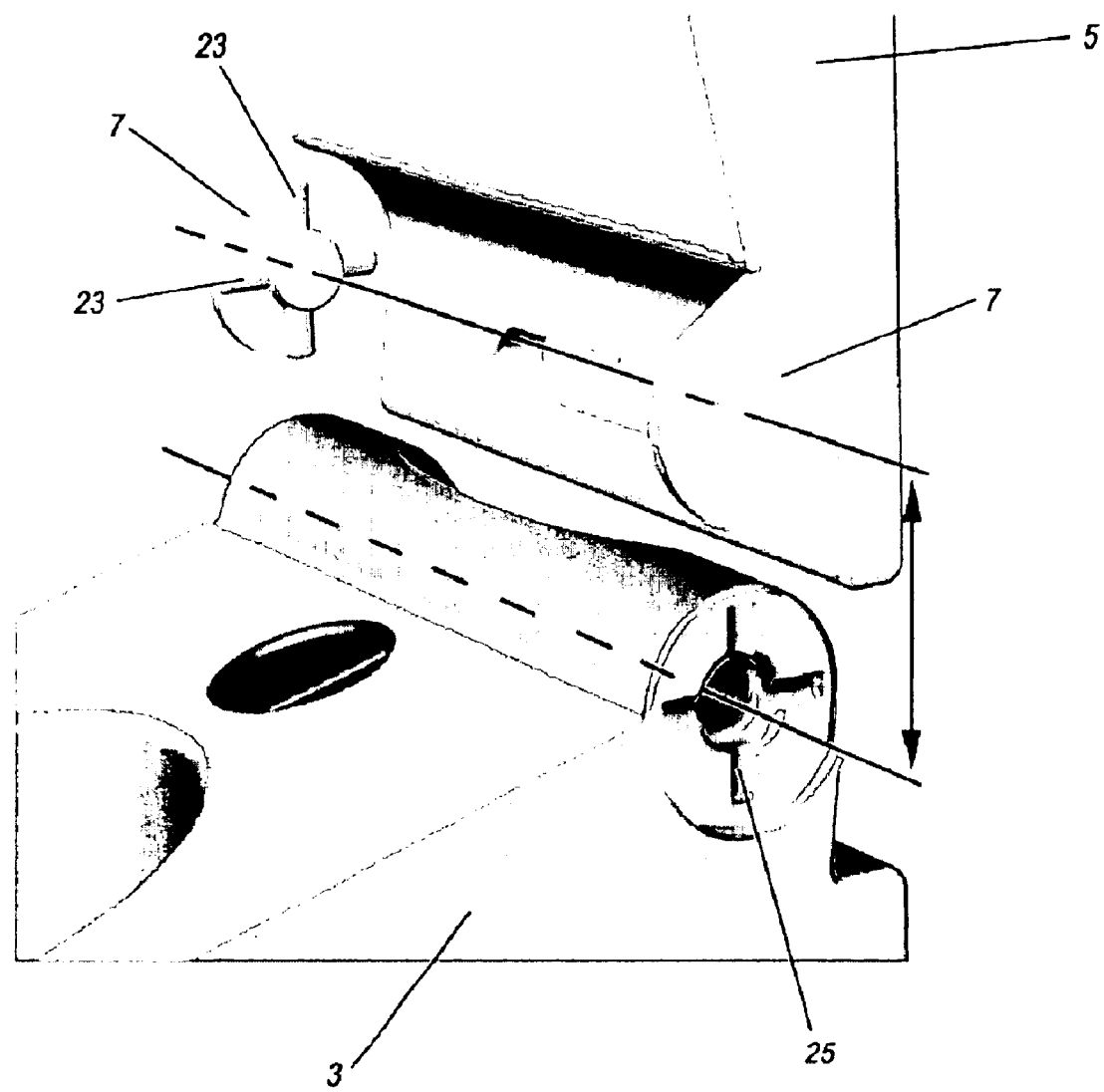
FIG. 7 provides an exploded fragmentary perspective view, showing the structure of the hinges used in the pet feeder of the present invention.

FIG. 7 shows the construction and operation of the hinges 7, by illustrating the base and lid portions in an exploded view. As shown in FIG. 7, the hinges include one or more male detents 23 which mate with recesses formed in base 3. The hinges 7 are positioned such that they snugly grasp the base, so that when the lid is opened by pivoting it about the hinges, the detents snap into the various recesses. Thus, the lid can be placed either in the open position or the closed position, and the lid will be firmly held, by the detents, in either of these positions. Other kinds of hinge and/or detent constructions could be used instead, within the scope of the invention.

Figure 8:
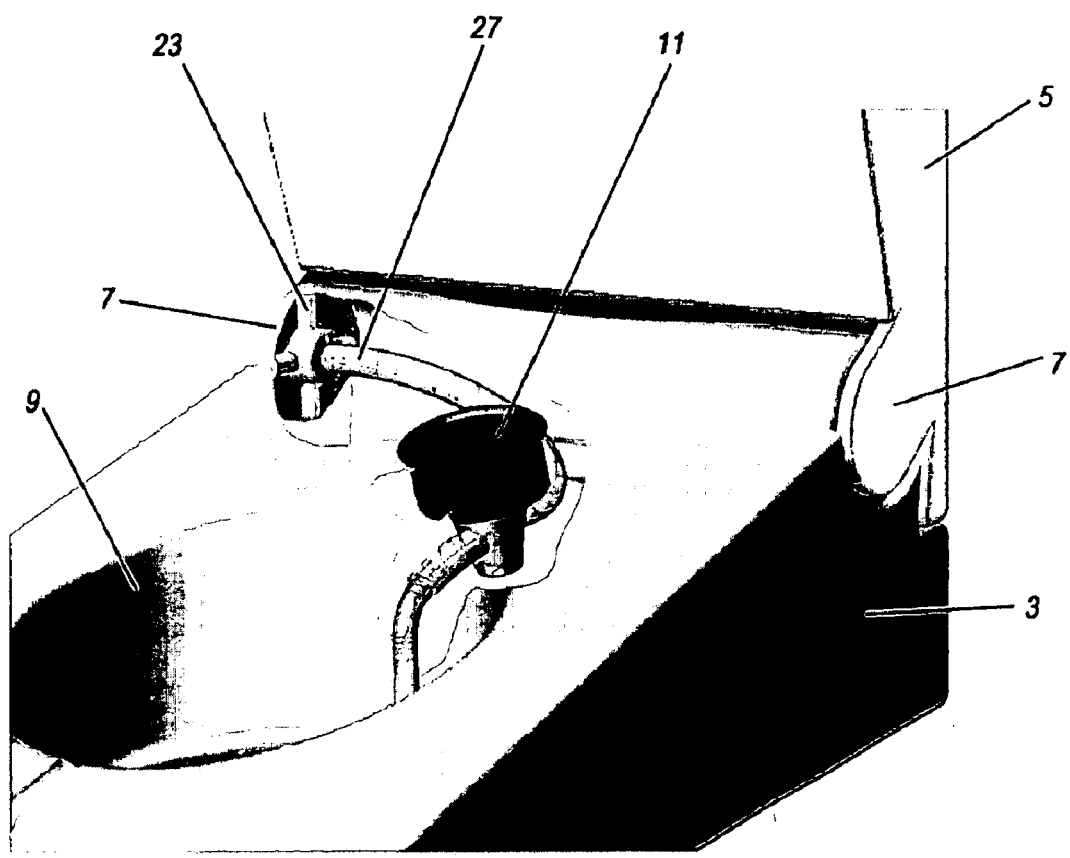
FIG. 8 provides a fragmentary, cut-away perspective view, showing the fluid connections used to supply water to a pet, in the pet feeder of the present invention.

FIG. 8 provides a cut-away perspective view showing the internal fluid connections of the pet feeder of the present invention. The hinge 7, including its male detents, is hollow, and its hollow interior communicates with the reservoir in the lid 5. Tube 27 connects the interior of the hinge with valve 11, allowing liquid to flow from the reservoir into the bowl 9.

Figure 9:
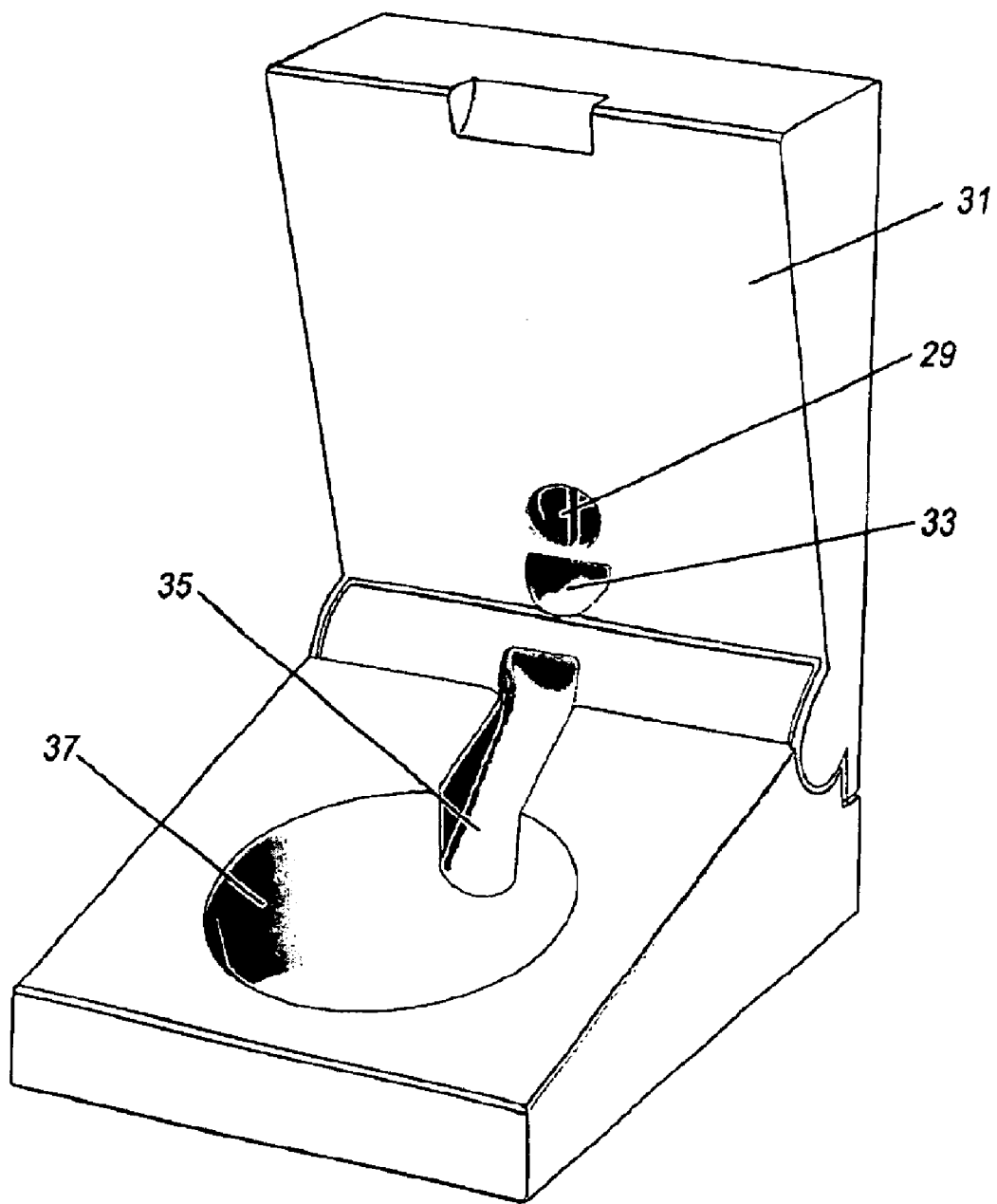
FIG. 9 provides a perspective view of an alternative embodiment of the invention which is intended to dispense solid food.

FIG. 9 provides a perspective view of another embodiment which is intended to dispense solid food. In the embodiment of FIG. 9, valve 29 is located on lid 31. The lid defines a reservoir, similar to that of the previously described embodiment, and the reservoir holds solid food. Preferably, the solid food is relatively granular, so that it can flow out of the reservoir like a liquid, under the influence of gravity. The valve is preferably constructed so as to dispense a measured amount of food. The valve may be of a type similar to that used for dispensing cereals and the like in restaurants, cafeterias, and motels, wherein the valve comprises a rotating member that captures a measured amount of food and transfers it to the bowl. However, the invention is not limited by the specific structure of the valve, and other valve constructions could be used instead.

Manual rotation of valve 29 causes the solid food to flow out of the reservoir and through opening 33, from which it falls onto chute 35, which carries the food into bowl 37. The angle made by the chute, relative to the horizontal, is chosen to be large enough that substantially all of the food will slide into the bowl, by gravity.

Except for the components that relate specifically to liquids, the remaining components of the feeder shown in FIG. 9 are similar to those of the previously described embodiment.

The embodiment of FIG. 9 differs from that of FIG. 1 in that it cannot continuously dispense food in the absence of the pet owner. Food is only dispensed, in discrete amounts, when the user rotates the valve 29. In the embodiment of FIG. 1, as long as the valve 11 is open, the liquid will be continuously replenished, provided that there is liquid remaining in the reservoir.

The operation of the pet feeder of the present invention can be summarized as follows. In the case of the the embodiment of FIG. 1, dealing with the dispensing of water or other liquids, the liquid is poured into the reservoir through the fill plug, though the valve is still in the closed position. The feeder is transported to the location where it is to be set down for the pet. If the feeder is to be transported a long distance, it is convenient to close the lid so as to make the feeder more compact during transport. The feeder is then set down and the lid opened. The valve is opened, and liquid flows out of the reservoir, to a level determined by the position of the end of the outlet pipe.

When it is desired to transport the feeder again, the user closes the valve, closes the lid, and lifts the feeder by the handle, allowing residual liquid to drain from the bowl through the groove. The feeder may now be transported, even if there is some liquid remaining in the reservoir.

The embodiment of FIG. 9 can be used in a similar manner, except that the user may need to replenish the food supply periodically, by operating the valve.

Figure 10:
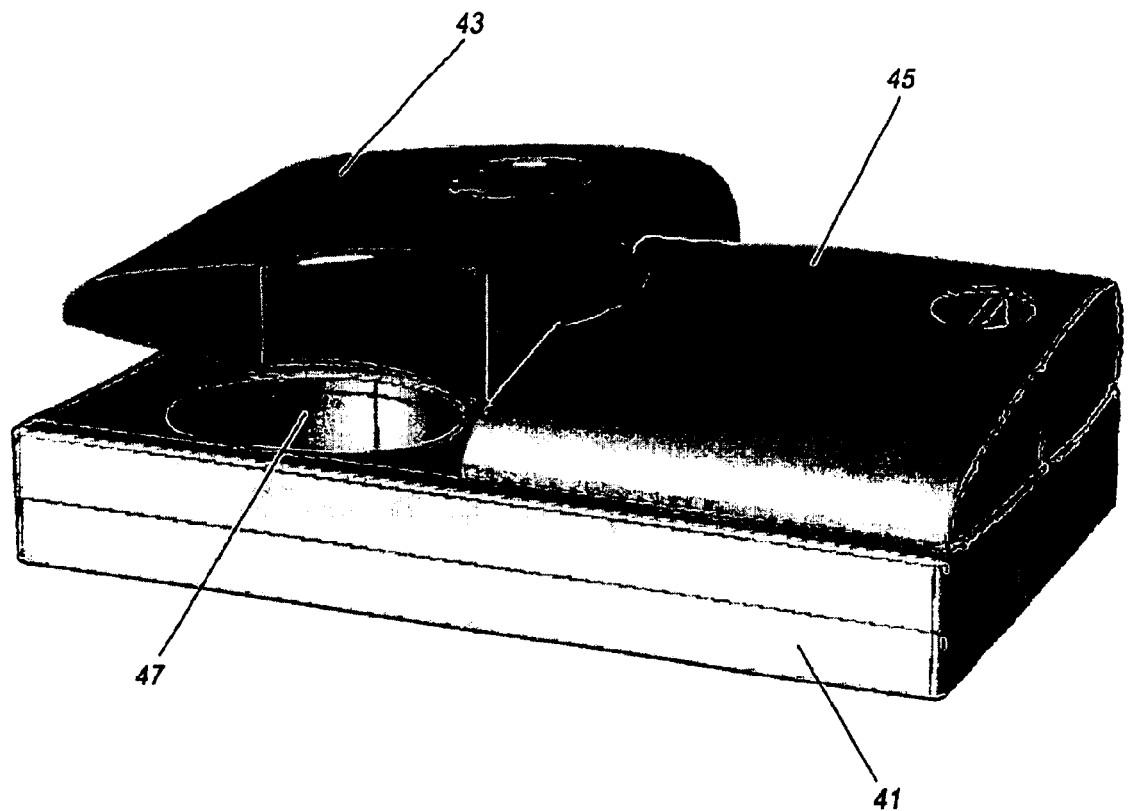
FIG. 10 provides a perspective view of another alternative embodiment wherein the pet feeder can dispense either or both of solid food and liquid.

The embodiments of FIGS. 1 and 9 can be effectively combined into one unit. FIG. 10 provides a perspective view of one possible version of this arrangement. In FIG. 10, a single base 41 defines separate bowls for solid food and for water. The device includes two distinct lids, identified by reference numerals 43 and 45. Only one of the bowls 47 is visible in the figure; the other bowl is hidden by lid 45 which is shown in its closed position. The lids are preferably constructed to be separately openable, either by swiveling horizontally, or by raising and lowering the lids in the manner depicted in FIG. 1. The construction and operation of each half of the device of FIG. 10 can be otherwise similar to those of the embodiments described above. In both halves, there must be some kind of passageway connecting the reservoir in the lid with its corresponding bowl. For example, if the right-hand side, represented by lid 45, is intended to dispense liquid, then lid 45 would define a liquid reservoir, and there could be a tube, valve, and outlet pipe, not visible in FIG. 10 but similar to those described with respect to FIG. 1. Similarly, if the left-hand side, represented by lid 43 is used to dispense solid food, there could be a valve, lid opening, and chute, not shown in FIG. 10 but similar to those described with respect to FIG. 9. Thus, the embodiment of FIG. 10 uses separate passageways, similar to those described for the previous embodiments, connecting the reservoirs in the lids to their corresponding bowls.

Both halves of the embodiment of FIG. 10 may be used simultaneously. It is also possible to keep one lid closed, and use the device for dispensing only solid food, or only liquid.

The invention can be modified in other ways. Instead of using a bowl which is integrally formed with, or defined by, the base, it is possible to provide a separate bowl that fits in a corresponding space formed in the base. The bowl could extend vertically above the base, in which case it would be necessary to provide a recess in the lid to accommodate the bowl when the lid is closed. One disadvantage of the latter arrangement is that it reduces the space available in the lid for use as a reservoir. Also, since the bowl is a separate component, the latter arrangement requires that the pet owner keep track of one additional item.

In another alternative construction, the bowl could be separate from the base, yet permanently or semi-permanently attached thereto.

In the embodiments of FIGS. 1 and 9, the base and lid have generally trapezoidal cross-sections which, when the lid is closed, together define a generally rectangular cross-section as shown in FIG. 6. Other shapes could be used instead, and the cross-section of the feeder in its closed position need not be rectangular. In particular, in the embodiment of FIG. 10, the base itself has a generally rectangular cross-section, and the lids have cross-sections that are generally ellipsoidal. The cross-section of the closed feeder, taken as a whole, is irregular, but still compact and convenient for transporting. Thus, the invention should not be deemed limited by the specific shape of the base and the lid.

All of the above modifications, and others which will be apparent to the reader skilled in the art, should be considered within the spirit and scope of the following claims.

What is claimed is:

1. A pet feeder comprising:

a) a base portion including a bowl, b) a lid portion defining a reservoir, and c) a passageway connecting the reservoir and the bowl, wherein the base portion and the lid portion are connected by a hinge such that the lid portion can be pivoted towards the base portion, to assume a closed position, and wherein the base portion and the lid portion are shaped complementarily such that, when the lid portion is in the closed position, the base portion and lid portion abut each other in a non-nesting relationship, and wherein the base portion and lid portion together define a compact structure having a generally rectangular cross-section.

2. The pet feeder of claim 1, wherein the bowl is integrally formed in the base portion.

3. The pet feeder of claim 1, wherein the hinge includes a detent which allows the lid portion to retain an open position relative to the base portion.

4. The pet feeder of claim 1, wherein the lid portion includes a cut-out comprising a handle, such that the pet feeder can be manually carried by the handle when the lid portion is in the closed position.

5. The pet feeder of claim 1, wherein the lid portion includes a recess which is capable of being manually gripped so as to open the lid portion.

6. The pet feeder of claim 1, further comprising a groove formed in the base portion, the groove communicating with an edge of the base portion and providing a path for liquid to flow out of the bowl when the pet feeder is transported.

* * * * *